H. P. MANLY.
INDICATING DEVICE OR THE LIKE.
APPLICATION FILED DEC. 14, 1915.

1,288,094.

Patented Dec. 17, 1918.
6 SHEETS—SHEET 1.

Witnesses
Robert H. Weir
Arthur W. Carlson

Inventor
Harold P. Manly
By [signature] Attys

H. P. MANLY.
INDICATING DEVICE OR THE LIKE.
APPLICATION FILED DEC. 14, 1915.

1,288,094.

Patented Dec. 17, 1918.
6 SHEETS—SHEET 2.

Witnesses:
Robert N. Evein
Arthur N. Carton

Inventor
Harold P. Manly
By ........
Attys.

H. P. MANLY.
INDICATING DEVICE OR THE LIKE.
APPLICATION FILED DEC. 14, 1915.

1,288,094.                                              Patented Dec. 17, 1918.
6 SHEETS—SHEET 4.

Fig. 11.

53 → Overland.
"AMBU" TROUBLE SHOOTER

| Take the following Ammeter Reading | This is what it should be | But if it is one of these | Look at List Given Below | Mark actual Reading here. |
|---|---|---|---|---|
| Engine Idle No lamps on | "0" | Discharge | No. 1 | |
| | | Charge | 2 | |
| Engine Idle Following Lamps on | About | "0" | No. 3 | |
| Heads only | 6 | Too High | 4 | |
| Sides only | 1½ | Too Low | 5 | |
| Head Side | 7½ | | | |
| Tail-Cowl | ¾ | Charge | 6 | |
| All lamps | 8½ | | | |
| No Lamps on Engine Running | | "0" | No. 7 | |
| 7½ m.p.h. | Slight Charge | Discharge | 8 | |
| | About | Below | 9 | |
| 10 m.p.h. | 10 amp. | Above | 10 | |
| 20 m.p.h. | 14 amp. | Below | 9 | |
| If Ammeter Hand Jumps | | | 11 | |

Fig. 12.

AUTOLITE         CHART No. 7.                    8

ENGINE RUNNING AT LOWEST SPEED MENTIONED. NO LAMPS ON

SHOULD READ CHARGE                    READS "0"

1st:  Turn on some lamps to make sure that the ammeter is not at fault. If the lamps light, but the ammeter still reads "0", the wires leading to the instrument are short circuited on each other, and must be separated,

2nd.  If the lamps will not light, look for broken or loose wires leading from battery to ammeter, fuse block and switches. See wiring diagram.

3rd.  If the ammeter shows a "DISCHARGE" with the lamps burning it may be assumed that the instrument is in order and the next thing to do is to remove both wires from the ammeter and replaced correctly. Then and connect one dyn dynamo 4th.                                                        the above test recom-
                                                    gine. Remove one wire from
                                spark wher, if is taken off, but no reading
            is replaced, there is a short circuit that allows an
        poss from dynamo to battery without going through the 5th.  If there is no spark when the battery wire is removed look at the cut-out and make sure that the contacts close. Stop the engine, watch the cut-out contacts, and again short the engine. If the contacts close, the cut-out is working but may be closing at too high engine speed. Run the age or engine at the speed mentioned for this test and watch the cut-out. If it does not close at this speed it should be adjusted as directed Witnesses:                                    Inventor
Robert H. Weir                                Harold P. Manly
Arthur W. Carlson                             By his attys

H. P. MANLY.
INDICATING DEVICE OR THE LIKE.
APPLICATION FILED DEC. 14, 1915.

1,288,094.

Patented Dec. 17, 1918.
6 SHEETS—SHEET 6.

Witnesses:
Robert H. Wein
Arthur W. Carlson

Inventor:
Harold P. Manly.
By Stice & Stice
Attys.

UNITED STATES PATENT OFFICE.

HAROLD P. MANLY, OF CHICAGO, ILLINOIS, ASSIGNOR TO AMERICAN BUREAU OF ENGINEERING INC., OF CHICAGO, ILLINOIS, A CORPORATION OF ILLINOIS.

INDICATING DEVICE OR THE LIKE.

1,288,094.   Specification of Letters Patent.   Patented Dec. 17, 1918.

Application filed December 14, 1915. Serial No. 66,709.

*To all whom it may concern:*

Be it known that I, HAROLD P. MANLY, a citizen of the United States, residing at Chicago, in the county of Cook and State of Illinois, have invented certain new and useful Improvements in Indicating Devices or the like of which the following is a description.

My invention relates to means for indicating or determining and assisting in the removing of abnormal conditions or faulty operation of devices, elements or combinations of parts, whose construction, operation, action, care or use depends upon the principles of mechanical, electrical, physical or chemical science. In carrying out the invention in the preferred form a suitable determining or indicating instrument, and a suitable chart or series of charts are preferably used, which are arranged to indicate a particular device or the like for which the same are applicable, together with certain tests or trials to be made thereon to determine by the resulting manifestations the fault or cause, said tests being indicated and suitably classified, and the proper and improper manifestations being indicated. In case of a certain abnormal or improper manifestation varying from the proper one or normal condition, the same is indicated, together with the cause and the proper correction thereof set forth. An illustrative chart of the device is also included in the preferred constructions shown, whereby the cause and correction may be more readily understood and followed. The invention has among its objects the construction of a device of the kind described that is simple, complete, efficient and satisfactory, and as a result of the use of it, possible errors, resulting damages as a consequence, are considerably reduced or eliminated. Likewise the highly skilled mechanics, are not so necessary, but mechanics of a lower order may do the work at less cost, and in less time. Other objects and advantages and applications of the mechanism, methods and means herein disclosed will be obvious from the disclosure herein given.

It may be mentioned, in order that the invention may be more clearly understood from the following description, that the parts and method or means of using the same herein described and indicated are particularly intended as a trouble finder and repair instrument for use in connection with automobiles, and the same is particularly desirable for use of repair men and garage owners where there are many makes of automobiles to be repaired or adjustments made, which may differ to a more or less extent. In these cases it is frequently difficult, even for skilled men, to readily ascertain the cause of a faulty operation and determine a proper correction thereof. While the apparatus and charts may be combined in one or more, and in various forms, I have shown for illustration the same in the form of a chart indicating instrument and a series of charts, there being ordinarily a set or series of charts for each particular type of machine or device, or particular type of any part thereof, this depending on the possible combination of certain charts, said charts being arranged to be used in conjunction with each other, and ordinarily referring from one to another where necessary. They are ordinarily bound in book form, but may be in card form, similar to any card filing and index system.

To this end my invention consists in the novel construction, arrangement and combination of parts herein shown and described, and more particularly pointed out in the claims.

In the drawings, wherein like reference characters indicate like or corresponding parts.

Fig. 11 is a plan view of an indicating key chart, which may be used when the instrument illustrated is not employed;

Fig. 12 is a view of one of the test and cause charts;

Before taking up the description of the particular set of illustrative mechanism, and cards or charts referred to and shown in the drawings, in order that the same may be more thoroughly understood, it may be well to refer to what the device is fundamentally, together with the preferred method of classification and elimination, and what in its broad sense the invention consists of.

First: It may be stated that the parts with the necessary modifications are applicable for all devices, combinations, etc., in which the construction, operation, action, care or use depends upon the principles of science, as previously referred to.

Second: Every device, element or combination consists of one or more parts, of which one or more or all are necessary for the construction, operation, action, care or use of that device, element or combination.

Third: Abnormal conditions or faulty operation can only be caused by the failure of one or more of these parts to perform its function; or, the failure of two or more to perform functions that are interdependent on the units affected.

Fourth: Considering the units one at a time, the faulty operation of, or abnormal conditions in, or the total or partial failure of the unit under consideration must result in certain definite manifestations.

Fifth: Each manifestation, then, is the result of the condition in (4). It is therefore possible to classify every possible abnormal condition or faulty operation under a heading designated by either the individual unit, the particular failure or function affected, or by the manifestation caused by the abnormal condition or faulty operation of the whole device, element or combination being considered or any of the parts thereof.

Sixth: Provided then, that the total number of failures of either the whole or any of its parts are classified as in (5); and provided also, that certain failures are found to come under one classification, but not under one or more of the other classifications; then it is possible, by observing the particular manifestation, to eliminate all those failures of the whole or any of its parts which have been found not to cause this particular manifestation.

Seventh: It follows, therefore, that the total possible number of failures in the whole or any of its parts may be divided into two parts, viz. (*a*) those failures that will or may cause the particular manifestation observed; and (*b*) those failures that cannot cause the particular manifestation observed.

Eighth: In locating the abnormal conditions or faulty operation present it is only necessary to consider the failures included in (*a*) above, and all those included in (*b*) may be neglected.

*Method of classifications (5, 6 and 7) and elimination (8).*

A. It is possible to cause the whole unit being considered to function in certain predetermined ways, or not to function in certain predetermined ways, and it is also possible to cause one or more parts of the whole unit to function or not to function in certain predetermined ways. By bringing about the conditions under which the whole or any of its parts should, or should not, function in certain predetermined ways, one of two results must be produced: (*a*) either the manifestations indicate proper functioning or lack of functioning as desired, or else (*b*) the manifestations indicate improper functioning or lack of functioning of the whole or any of its parts.

B. By designating the manifestations that should be the result of certain predetermined conditions provided the whole and all of its parts function normally, it may be determined whether the manifestations indicate abnormal or normal conditions and faulty or proper operation. The manifestations that indicate proper functioning may be neglected.

C. Manifestations which indicate improper functioning may, or may not, be further subdivided into classifications based on the relation of the actual manifestation to that which would indicate proper functioning or to that which would indicate improper functioning of the whole or any of its parts.

D. According to the principles set forth in (4), any one manifestation or any series of manifestations, taken separately or in connection, must indicate proper functioning or improper functioning of the whole or any of its parts. By designating each manifestation of either class so that it may be indicated as a distinct and separate manifestation from others, and placing a relation between the indicated manifestation and a corresponding class of causes of faulty or proper functioning of the whole or any of its parts, it is possible to designate from among the total number of possible functionings, either proper or improper, or the whole or any of its parts, which ones are included in the classification found to result from a certain proper or improper functioning.

E. By noting, either mentally or otherwise, the actual manifestation under certain predetermined conditions, and comparing this actual manifestation with those in (C), one or more classes of causes of proper or improper functioning may be found, whose manifestations are the same as those actually present, and in these classes will be found the cause of manifestations present.

What does it consist of?

1st. A testing device, key chart, or the equivalent, allowing the application of the method of classification and elimination describer under A, B, C, D, and E, and which makes use of the principles in 2, 3, 4, 5, 6, 7 and 8, and which preferably may be calibrated or adjusted for different types of apparatus.

2nd. A classification or series of classifications of the causes of faulty operation or abnormal conditions described in 5, 6, 7, 8 and D; either combined with or separate from those actions which should be taken in the elimination of certain causes, in the detection of certain causes, or in the removal or correction of those causes of improper functioning found to exist.

3rd. An exposition of the actions which should be taken in the removal or correction of those causes of faulty functioning found to exist by the use of "2nd."

4th. Such diagrams or illustrations of construction, operation or use of the whole or any of its parts as are required for the proper application or understanding of "2nd" and "3rd."

Figure 15:
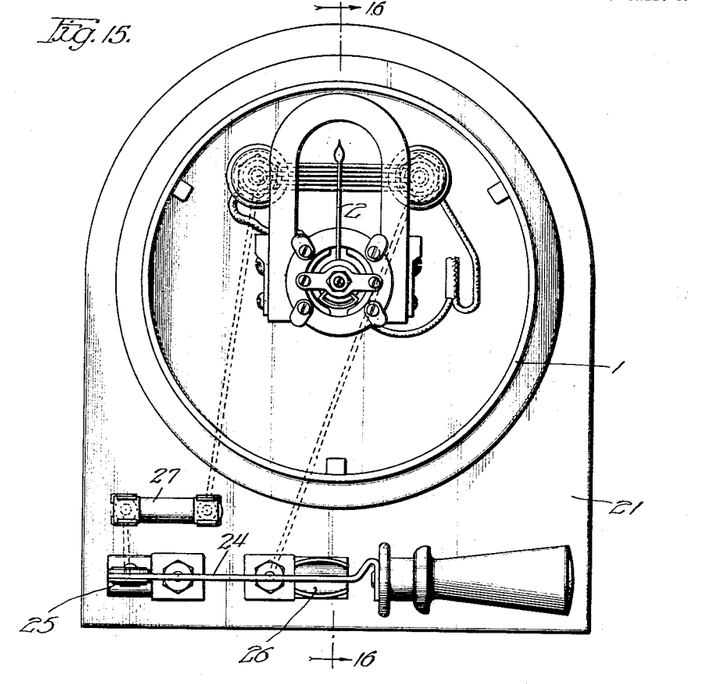
Fig. 15 is a face view of the indicating instrument shown in Fig. 1 with the dials removed.
Figure 16:
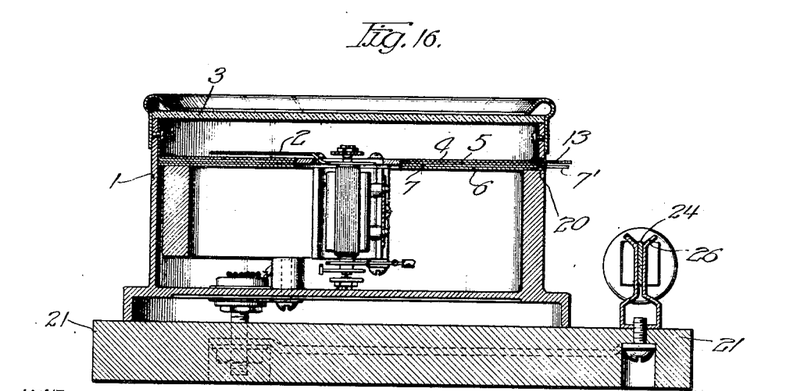
Fig. 16 is a sectional view taken substantially on line 16—16 of Fig. 15.

Referring to the drawings, the instrument preferably consists of a casing 1 containing suitable indicating mechanism, which may be electrically or otherwise controlled or actuated. The instrument shown is similar to an ammeter, in that it is provided with a pointer or indicator 2, which is electrically actuated and controlled by the mechanism within the casing. In the instrument shown a glass plate or face 3 is arranged over the mechanism, the glass being transparent about the periphery, permitting the reading of the dials through the same. In Figs. 15 and 16 the interior mechanism, which as mentioned is substantially an ammeter, is shown in detail together with the various connections. In view of the fact that the construction and operation of this type of apparatus is well known I have not considered it necessary to describe the same in detail, nor to illustrate detail parts. In addition, the style of ammeter may be varied in accordance with the practice of different manufacturers.

In the illustrative instrument shown, there are substantially four coöperating dials, the same being arranged for adjustment calibrating for different types of mechanism. As previously stated, I have illustrated the invention as applicable for use in determining automobile electric troubles, the different makes of automobiles, or different types of apparatus to be tested, and the trouble determined and correction made, being given a key number or other identification.

The coöperating dials are best illustrated in Figs. 3 to 6 inclusive, which show the same disassembled from the instrument. In the preferred construction, dials 4, 6 and 7 are adjustable, while dial 5 may be made non-adjustable or fixed. Dials 4, 6 and 7 are formed with a central cut-out portion 8, the purpose of the same being more fully described hereafter. The dial 4 is formed with a series of openings or apertures 9, 10, 11 and 12, and with an operating lever or handle 13. For convenience in reading the instrument, I indicate the openings by certain identifying marks to indicate the conditions or circumstances under which a reading is to be taken, at opening for the different conditions. Opening 9 I have indicated as for the reading when the engine is idle and the lamps are off; opening 10 when the engine is running and the lamps are off, and opening 11 when the engine is idle and the lamps are on; openings 12 are intended to display identifying marks, characters, or the like, which I have previously mentioned as key numbers, indicating the particular type of machine to be tested, and I have indicated these openings as key number. Of course the particular indications here are merely illustrative, this depending on the use to which the instrument is to be put. I also preferably draw a line or indicating mark 2′, arranged to register with the indicator 2 when dial 4 is moved (if necessary) in taking a reading, as will be more fully explained in the operation of the device. Dial part 5 is formed with an opening or cut-out portion 5″, and with lugs 5′ for securing the same in place, as hereafter described. The same is also formed with a character or identifying mark, for example N, as indicated at 14, and with certain identifying marks 14′, which may be individually displayed through certain of the openings, as will be hereafter referred to.

Figure 5:
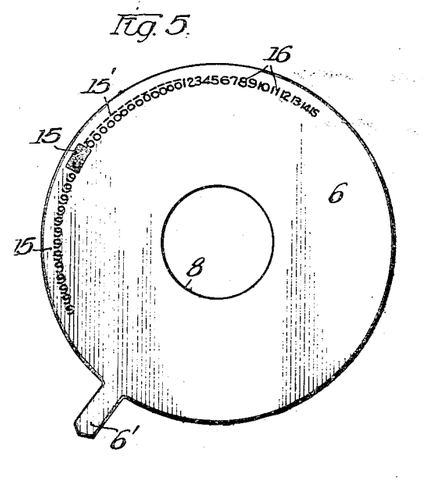
Fig. 5 is a similar view of another co-operating scale dial.

Dial or part 6 is formed with a coöperating or controlling lever 6′, by means of which it may be partially rotated, and with characters or identifying marks 15 and 15′. It is also arranged with identifying characters 16, which are to be displayed through upper key number opening 12, so as to indicate the proper setting of the dial.

Figure 6:
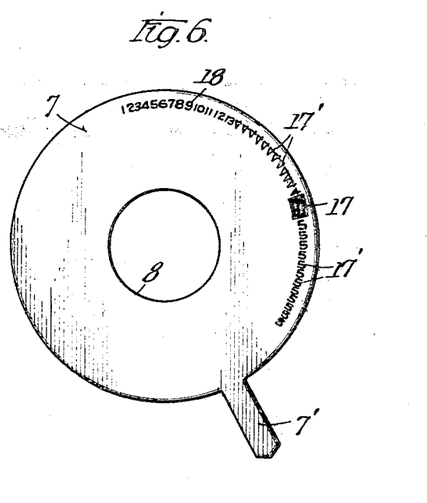
Fig. 6 is a similar view of another co-operating scale dial.

Dial or part 7 is formed with an opening 8, as mentioned, and with an extension 7' for moving or adjusting the same. It also contains identifying characters or marks 17 and 17' and key number identifying marks 18.

Figure 1:
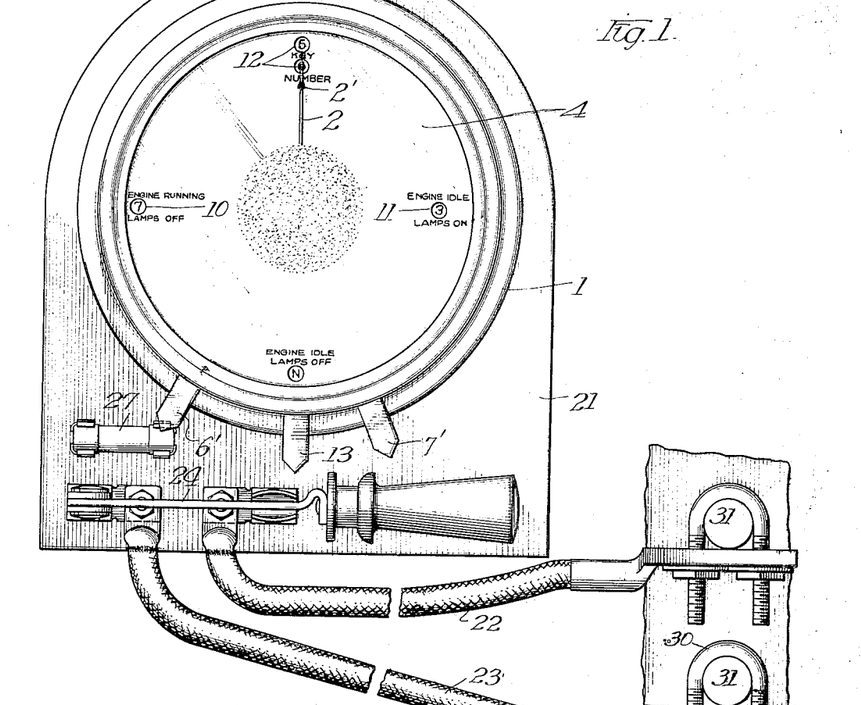
Figure 1 is a plan or face view of one form of indicating instrument.
Figure 2:
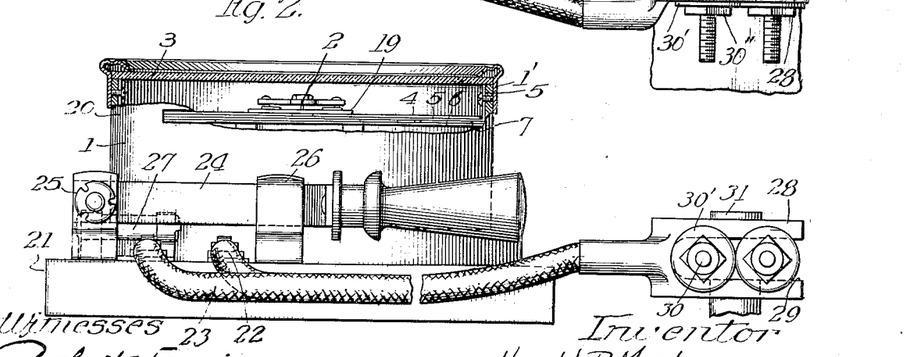
Fig. 2 is a side elevation of the same, a portion of the instrument broken away.
Figure 3:
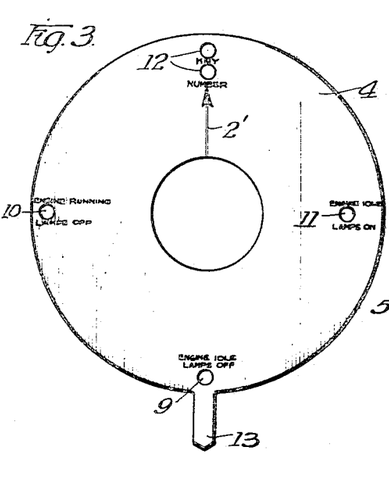
Fig. 3 is a plan view of the face dial removed from the instrument.
Figure 4:
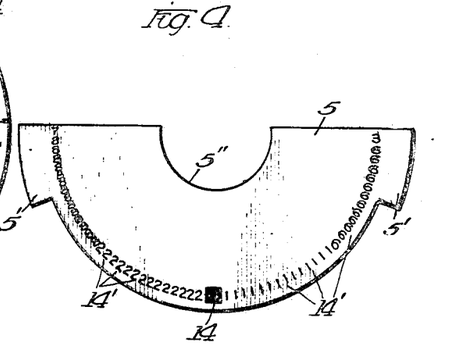
Fig. 4 is a similar view of one of the co-operating scale dials.

The several dials are assembled in the instrument by first placing the dial 6, as shown in Fig. 2, the opening 8 pivotally centering the same about the part 19, which is carried on the interior of the instrument in any desired manner, and about which is arranged indicator 2. Dial or part 7 is positioned over dial 6, and over this is arranged dial 5. Dial 5 may be secured in position by attaching the upturned parts 5' to the casing, as indicated in Fig. 2, or in some equivalent manner. Arranged above dial 5 is the top or face dial 4. The extension 13—6' and 7' are of sufficient length to extend through a slot 20 (see Fig. 2) in the casing, as shown in Fig. 1, so that they may be operated or shifted as desired. The devices may be associated or connected with the device to be tested in any suitable manner. The instrument shown is suitably connected up with the cables or conductors 22 and 23, which are connected to suitable contacts, arranged for attachment on the apparatus to be tested, as will be hereafter described.

In using the instrument, assuming that the same is set up as shown in Fig. 1, with the dials substantially in the positions shown, that is with dials 6 and 7 adjusted for the testing of a piece of apparatus bearing the key number 56: Referring to Fig. 1, it will be noted that 56 is indicated at the openings 12, showing that the machine is properly set. If another member was to be set up, as for instance 89, extension 6' would have to be shifted to the right to bring the character 8 at the proper opening 12, and 7' shifted in this case also to the right to bring the identifying 9 to the indicating characters 18 to register with the lower opening 12, thus adjusting the several dials.

Figure 7:
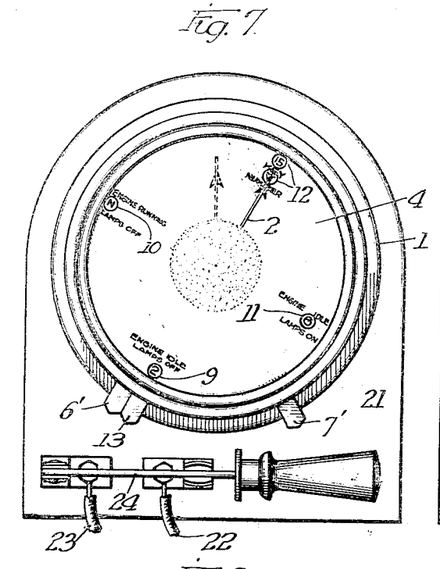
Fig. 7 is a plan view of the instrument illustrating the same in use.
Figure 8:
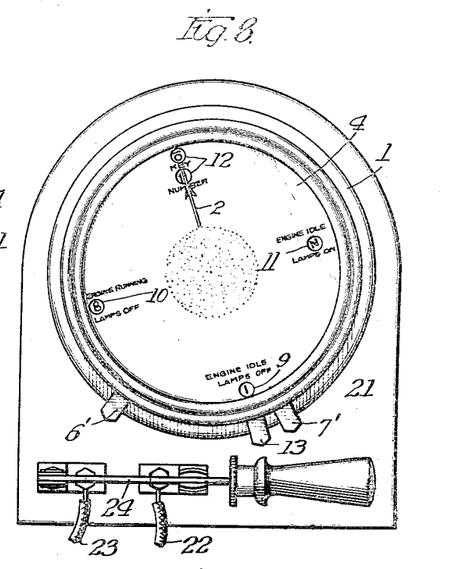
Fig. 8 is a similar view of the same in use.
Figure 9:
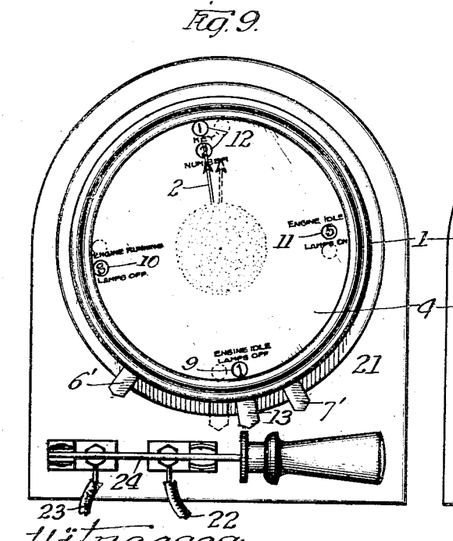
Fig. 9 is a similar view of the same in use.
Figure 10:
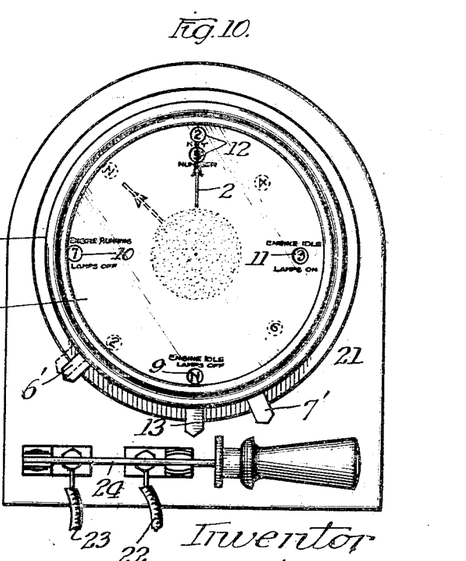
Fig. 10 is a similar view of the same in use.

Assuming, however, that 56 is the key number: If, when the engine is idle and the lamps are off, the character 14 (see Fig. 4) or N appears in the opening marked—"Engine idle, lamps off,"—as shown in Fig. 1, we know that for that test the indication is normal, indicating that the apparatus is all right. If, however, the electrically controlled pointer or indicator 2 swings to the right, for example as indicated in Fig. 7, the dial 4 would be shifted by means of the extension 13, so that the indicating mark 2' (see Fig. 3) would register with or coincide with the indicator 2, as shown in Fig. 7. This would indicate (see Fig. 7) that there was a trouble, the cause, and possible removing of the same being indicated by the numeral 2, in the opening—"Engine idle, lamps off"—on part 5, shown in Fig. 4. In this case a proper chart, for example, corresponding with chart 32 shown in Fig. 12, would be referred to. This chart would indicate further tests to be made and adjustments to be made to correct the fault.

I have shown the conductors 22 and 23 connected to binding posts 26 and 25 respectively, which are suitably connected with the instrument, 27 being a fuse which may be provided, if desired. The contacts 25 and 26 are shown arranged in form of switch contacts, and a switch bar 24, or its equivalent, provided so that the contacts 25 and 26 may be connected or short circuited between the apparatus and the instrument, should the same be desired at any time. The conductors 22 and 23 are suitably insulated or covered, and are provided with contacts 28 for attaching the same to the apparatus. It may be mentioned that the fasteners 28 are arranged so as to be attached to practically any type of binding post or other part in an electrical system. In some cases binding posts similar to 31 are employed, the sizes, shapes and forms varying in different types of apparatus to be tested, and in some sockets are provided in which the members 28 may be inserted. In the present construction members 28 are slotted as at 29, and the U-bolts 30 arranged with nuts 30'', and washers 30' are provided, the same extending through slot 29. This method of fastening the conductors in the system makes the same suitable for practically all kinds of equipment, so that the same may be termed "universal."

Figure 13:
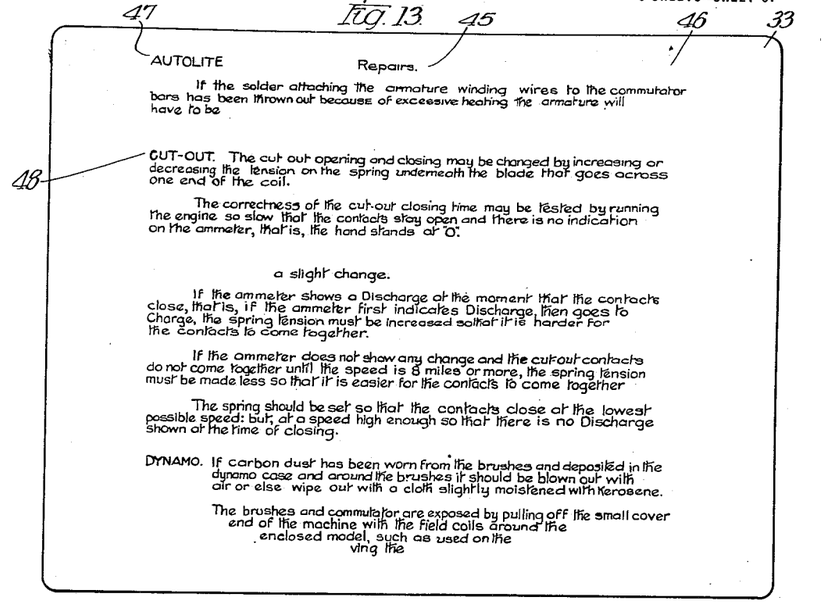
Fig. 13 is a similar view of one of the repair charts.
Figure 14:
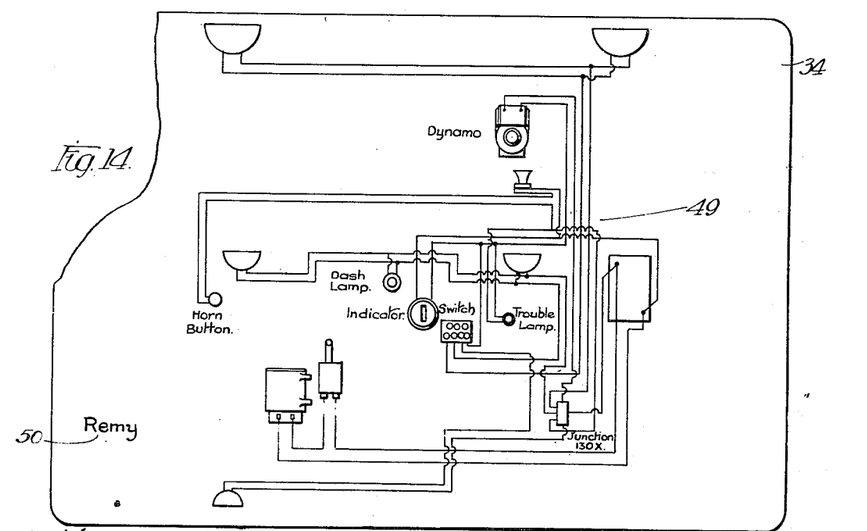
Fig. 14 is a similar view of a diagram or illustrated chart.

The charts previously referred to are shown in Figs. 12, 13 and 14, an additional chart being shown in Fig. 11. Chart 32 shown in Fig. 12 is illustrative of a type of chart arranged to be used in connection with mechanism previously described and designated thereby. For illustration this is one of the charts designated by number 7 on the instrument. It may be stated that it may be displayed under certain circumstances at opening 10 as shown in Fig. 1, in making a test with the engine running and the lamps off. This chart may be provided with a designating name 37, indicating a particular type of device or machine, the same in practice corresponding to or relating to the designation or key number shown in space 12 of Fig. 1. It may also bear the designation as at 35, identifying the chart, and may be paged as at 36, when consisting of more than one page or subject matter. For convenience and to prevent mistake the same may also bear the condition or particulars of the test, as indicated on the illustrative chart at 38, to-wit, "the engine running at lowest speed, no lamps on," and the normal indication at 42 showing what the normal reading should be. I have also shown a possible manifestation, "zero" indicated at 43, the purpose of this being more fully explained hereafter. On the body of the chart, for instance as at 39, may be indicated certain steps to take to ascertain the cause of the trouble. The trouble indicated may be caused by several things, and if the first possible cause considered is not the real cause of the trouble, perhaps the second might be, etc. It will be noted that the corrections are indicated, as are further tests, and that the second paragraph makes reference to the wiring diagram as at 40, this diagram being further referred to as contained on chart 34. If, after, however, paragraph 5th is reached, and none of the possible preceding causes set forth being found, further instruction is given and reference made, for example, as at 41, to the adjustment of the cut-out. For illustration, it may be assumed that this is the cause of the trouble.

It will be noted that at 41, it states, "It should be adjusted as directed." This calls for a repair and reference is made to chart 33, which is supplemental, and which amplifies the chart 32. Chart 33 may bear a designation 47, similar to 37 on the other card, together with the title of the card at 45, and the same may be paged as at 46, or the "cut out" set out as referred to at 48. From the instructions contained on chart 33, proper repairs may be made according to directions. If necessary, chart 34 can be referred to. This chart bears a title or designation as at 50, which in a complete set should correspond with the designations set forth on the other cards. Chart 34 bears any illustrative matter, as for example the wiring diagram 49, as shown in Fig. 14. In addition any other features, parts or details may be shown on the same or on supplemental charts, the one shown being merely for illustration.

After the corrections are made the previous tests may be made again in order to verify the correction, and if necessary the testing operations continued and further troubles determined and corrections made. As has been previously mentioned, the instruments and charts shown in the drawings are merely to illustrate the application of the invention as applied to one particular use, to-wit, repairing automobiles and electrical equipment of the same, the complete charts for doing so not being shown. The same is, however, applicable to other types of equipment and other devices than automobiles. In view, however, of the very clear illustration, it is considered not necessary to illustrate the many applications. It is applicable to all types of machinery, devices, elements or condition of parts involving the principles of electrical, physical and mechanical science. As a further illustration of the wide use, the same might be designed, for example, for the medical profession, a device being constructed to indicate certain manifestations, and the charts indicating the effect, the cause and remedy. Where the same is designed for automobile use, a complete set is preferably provided to a garage owner, mechanic, or the like, for each manufacture of a car or particular type of equipment carried thereby, so that in practically a moment's time even an inexperienced employee can determine the car trouble or cause, and know what to do and how to remove the cause. As before mentioned, the charts may be in book form, or merely cards or in large wall charts.

Where the instrument is not obtainable or desired, a chart similar to that shown in Fig. 11, and an ammeter, or its equivalent, may be employed, or other instrument suitable for the purpose. The chart shown in Fig. 11 is one applicable for one particular machine or type of apparatus, it being necessary to have a separate chart for each kind or type of apparatus, which chart, however, may be applied by means of the instrument previously described.

Referring to the drawings, in Fig. 11 is illustrated what may be termed a key chart or card 51, by means of which, by following certain directions, a particular trouble or effect of improper functioning or operation may be determined, and by determining the trouble, the proper chart hereinafter referred to can be determined from which the cause may be ascertained. The card is preferably provided with a designation similar to 53, indicating a particular make of automobile or other mechanism, and with a designation 54, indicating a test to be made in the case illustrated, an ammeter test, with designations 59 and 60 indicating the conditions under which the tests should be followed. I also preferably provide a column 61, having properly designated spaces, in which may be indicated what a reading of the ammeter or normal manifestation should show. I also provide a designated column 56, in which is indicated possible comparative readings or manifestation 62, differing or ranging from the normal. This is the same as indicated at 43 on chart 32. (See Fig. 12.) There is also provided on this chart a column 63, in which are arranged designating characters, referring to the related charts, to be considered for the different combinations that may be found. There is also provided a designating space 65, a key, letter or designating character 66, for showing another condition or manifestation which may show. While not necessarily, I preferably provide a column 58, which is blank, in which an identifying mark as a reminder, as for example 64, may be placed to indicate where a condition or conditions out of the normal are found. For illustration, in making the tests in the order shown, the readings were normal, until with no lamps on and the engine running at the lowest speed when there should have been a slight charge manifested, the ammeter showed zero. This indicating a wrong condition, the same is noted, and chart number 7 (see Fig. 12) indicated in column 57 is referred to.

From the preceding description it will be noted that the device is substantially a trouble finder, and in its entirety and preferred arrangement and combination broadly consists substantially in a chart or series of charts, or the equivalent, having thereon in properly classified order an exposition of the normal and possible abnormal manifestations of a device to be tested, as well as steps to be taken to determine and remove the cause or causes of the abnormal manifestations, said charts arranged or having means for identifying the particular classes or sub-classes of manifestations or troubles, in combination with an indicating instrument, suitable to the general class of devices to be tested, which may be calibrated for the particular device to be tested, and arranged to be operatively associated or connected with the device to be tested, the instrument being provided with suitable means for designating a particular class or sub-class among those set forth on said chart, applicable to the trouble or to the particular manifestation caused by the trouble as shown by the instrument in making the test. The particular instrument is adapted for one style of indicator control, but where the indicator control is different, the dials may be arranged or modified to suit without changing the principles of operation.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. A testing instrument of the kind described, comprising an indicator, actuating means therefor, and means for connecting said actuating means with the device to be tested, a dial arranged in back of the indicator and movable for adjustment relative therewith for registering with the indicator, dials arranged in back of said first dial, and means for adjusting said dials and calibrating the instrument for the particular device to be tested, said dials having suitable indicating characters thereon, said first dial arranged to display a character or characters on the other dials to identify a particular movement of the indicator corresponding with the conditions met in making the test of the device desired to be tested.

2. A testing instrument of the kind described, comprising the combination of a movable indicator, controlling mechanism therefor, and means for operatively connecting said mechanism with the device to be tested, a dial arranged in back of said indicator and movable to coöperate therewith, a second dial and a third dial adjustably arranged back of the first dial, and a fourth dial arranged back of said other dials, said dials provided with suitable characters thereon for identifying certain manifestations of the indicator, the first dial arranged to display the characters on the other dials when the first dial is adjusted to operatively register with the indicator, and means for controlling said first, second and third dials to adjust the instrument as desired.

3. A testing instrument of the kind described, comprising a movable indicator, electrically controlled actuating means therefor provided with means for operatively connecting the same with the mechanism to be tested, a dial arranged to coöperate with said indicator and movable to register therewith, said dial provided with means for determining the registering with the indicator, coöperating dials arranged in back of said first mentioned dials and having suitable gradations thereon, with means for identifying the same, said first dial arranged to permit the display of a definite character upon adjustment thereof relative the indicator.

4. A testing instrument of the kind described, comprising a movable indicator, actuating and controlling mechanism therefor having means for operatively connecting the same to the device to be tested, a movable auxiliary indicator provided with means for moving the same to register with said first mentioned indicator, a fixed dial and a movable dial arranged in back of said auxiliary indicator and provided with suitable graduations thereon, arranged with characters to define and identify movements of the auxiliary indicator relative the same, said movable dial provided with a series of calibrating graduations thereon, with means for identifying each particular graduation, said auxiliary indicator having openings therethrough of a size and so disposed thereon as to indicate substantially a single character on either dial, and with openings arranged to display an individual calibrating designation on the movable dial, whereby the movable dial may be set to calibrate the instrument for a particular machine to be tested, and the auxiliary indicator moved to register with the indicator to display an individual character on one of said dials suitable for the manifestation exhibited by the indicator in testing the device.

5. In a testing instrument of the kind described, and in combination a suitable casing, an indicator, and actuating means therefor arranged within the casing, and means for connecting said actuating means with the device to be tested, a pivotally supported dial arranged in back of the indicator and movable for adjustment relative therewith for operatively registering with the indicator, pivotally supported coöperating dials arranged in back of said first dial, and means at the exterior of the casing for adjusting said dials and calibrating the instrument for the particular device to be tested, said dials having suitable indicating characters thereon, said first dial having openings to display a character or characters on the other dials to identify a particular movement of the indicator corresponding with the conditions met in making the test of the device desired to be tested.

6. In a testing instrument of the kind described and in combination, a movable indicator, controlling mechanism therefor, and means for operatively connecting said mechanism with the device to be tested, an indicating dial arranged in back of said indicator and movable to register therewith, a fixed dial arranged at the back of said first dial, a third dial adjustably arranged back of the first dial, and a fourth dial arranged back of said other dials, said dials provided with suitable characters thereon for identifying certain manifestations of the indicator, the first dial arranged to indicate the characters on the other dials when the indicating dial is adjusted to operatively register with the indicator, means for moving said third and fourth dials to adjust the instrument as desired, and means for indicating the adjustment as made.

7. A testing instrument of the kind described, comprising a movable indicator, electrically controlled actuating means therefor provided with means for operatively connecting the same with the mechanism to be tested, an indicating dial arranged to coöperate with said indicator and movable register therewith, said dial provided with means for determining the registering with the indicator, coöperating dials arranged in back of said first mentioned dials and having suitable graduations thereon, with means for identifying the same, said indicating dial arranged to indicate a reading on the other dials upon adjustment of the indicating dial relative the indicator.

8. In an electrical testing instrument of the kind described, and in combination, a movable indicator, actuating and controlling mechanism therefor, and means for electrically connecting the same to the mechanism to be tested, and adjustable dials arranged to coöperate with said indicator, said dials provided with suitable characters thereon for identifying the movements of the indicator, means for adjusting said dials to calibrate the instrument in a predetermined manner suitable for the apparatus to be tested.

9. In an electrical testing instrument of the kind described and in combination, a movable indicator, actuating and controlling mechanism therefor, and means for electrically connecting the same to the mechanism to be tested, and adjustable dials arranged to coöperate with said indicator, said dials provided with suitable characters thereon for identifying the movements of the indicator, means for adjusting said dials to calibrate the instrument in a predetermined manner suitable for the apparatus to be tested, and means for indicating the particular adjustment of the dials.

10. In a testing instrument of the kind described and in combination, a movable indicator, actuating and controlling mechanism therefor having means for operatively connecting the same to the device to be tested, a movable auxiliary indicator provided with means for moving the same to register with said first mentioned indicator, a fixed dial and movable dials arranged in back of said auxiliary indicator and provided with suitable graduations thereon, arranged with means of defining movements of the auxiliary indicator relative the same, said movable dials provided with a series of calibrating graduations thereon, with means for identifying each particular graduation, said auxiliary indicator having openings therethrough of a size and so disposed thereon as to indicate substantially a single character on either dial, and with openings arranged to display individual calibrating designations of the movable dials, whereby the movable dials may be set to calibrate the instrument for a particular machine to be tested, and the auxiliary indicator moved to register with the indicator to display an individual character on one of said dials suitable for the manifestation exhibited by the indicator in testing the device.

11. In a testing instrument of the kind described and in combination, a movable indicator, actuating and controlling mechanism therefor having means for operatively connecting the device to be tested, dials arranged in back of said indicator and having means thereon for defining the movements of the indicator, and means for adjusting a portion of said dials to calibrate the instrument for a particular apparatus to be tested.

12. In a testing device of the kind described and in combination, a testing instrument having an indicator and dials provided with identifying characters, controlling and actuating means for the indicator, and means for operatively connecting the same with the device to be tested, and associated coöperating charts having displayed thereon in detail the posssible cause of manifestations that might be indicated by the indicator of the instrument resulting from the testing, said associated charts having means corresponding with the identifying characters on the dials for identifying the manifestations of the indicator.

In testimony whereof, I have hereunto signed my name in the presence of two subscribing witnesses.

HAROLD P. MANLY.

Witnesses:
C. J. BUCKWALTER,
ROY W. HILL.